(12) United States Patent
Walker et al.

(10) Patent No.: US 7,286,857 B1
(45) Date of Patent: Oct. 23, 2007

(54) ENHANCED IN-VEHICLE WIRELESS COMMUNICATION SYSTEM HANDSET OPERATION

(75) Inventors: Michael R. Walker, Palo Alto, CA (US); Sean D. Taylor, Fremont, CA (US)

(73) Assignee: AT Road, Inc., Fremont, CA (US)

( * ) Notice: Subject to any disclaimer, the term of this patent is extended or adjusted under 35 U.S.C. 154(b) by 540 days.

(21) Appl. No.: 09/965,232

(22) Filed: Sep. 25, 2001

(51) Int. Cl.
  *H04Q 7/20* (2006.01)
(52) U.S. Cl. .............................. 455/569.2; 455/575.9; 455/420; 455/566
(58) Field of Classification Search ...... 455/41.1–41.2, 455/556.1, 557, 566, 569.1, 569.2, 575.9, 455/99, 100, 573, 563, 420; 340/426.19, 340/426.2, 825.49; 701/1–2, 32–33, 51, 701/213, 52
  See application file for complete search history.

(56) References Cited

U.S. PATENT DOCUMENTS

| | | | | |
|---|---|---|---|---|
| 5,991,640 | A * | 11/1999 | Lilja et al. ................... | 455/557 |
| 6,246,935 | B1 * | 6/2001 | Buckley ...................... | 701/36 |
| 6,369,717 | B1 * | 4/2002 | Damiani et al. .......... | 340/815.4 |
| 6,526,335 | B1 * | 2/2003 | Treyz et al. ................... | 701/1 |
| 6,760,600 | B2 * | 7/2004 | Nickum ...................... | 455/557 |
| 2001/0035683 | A1 * | 11/2001 | Yearwood et al. .......... | 307/10.1 |
| 2002/0032048 | A1 * | 3/2002 | Kitao et al. ................. | 455/569 |
| 2003/0008680 | A1 * | 1/2003 | Huh et al. ................... | 455/557 |

FOREIGN PATENT DOCUMENTS

| JP | 10233865 A | * | 9/1998 |
|---|---|---|---|
| JP | 10291446 A | * | 11/1998 |

OTHER PUBLICATIONS

Jon Byous, *The Network Vehicle: A Smart Way to Go* (visited Sep. 10, 2001) http://java.sun.com/features/1997/nov/javacar.html.

* cited by examiner

*Primary Examiner*—Jean Gelin

(57) ABSTRACT

In-vehicle operation of a wireless communication system handset is enhanced by using a handset controller having large keys and a large display. The controller is mounted in the vehicle so that the keys and the display are accessible by a user while seated in the vehicle driver's seat. The keys and display are backlighted to improve visibility. The controller warns the user in the motor vehicle that the handset is disconnected from the controller. The controller accepts verbal commands to operate the handset and outputs messages received by the handset and other information associated with handset operation as synthesized speech.

54 Claims, 5 Drawing Sheets

ENHANCED IN-VEHICLE WIRELESS COMMUNICATION SYSTEM HANDSET OPERATION

BACKGROUND

1. Field of Invention

In-vehicle operation of a radio (wireless) telephone handset, and in particular enhancing the operation of a cellular telephone handset by using an in-vehicle data terminal that is associated with a motor vehicle fleet management system.

2. Related Art

In-vehicle fleet management systems that communicate the vehicle's location, for example as determined by using Global Positioning System (GPS) information, to a central location are known. Such systems (e.g., the FLEETASAP™ motor vehicle fleet management system produced by At Road, Inc., Fremont, Calif.) typically include a location manager that determines the vehicle position and a data terminal electrically coupled to the location manager. A wireless modem in the location manager typically facilitates communication between the location manager and a central computer platform configured to act as a server (provider of specific facilities to client devices) via, for example, a cellular telephone system. Thus both the vehicle position and the data input on the data terminal are communicated to the central server. In addition, the server communicates data (e.g., messages) to the location manager for output on the data terminal. Fleet management systems also typically offer two-way message capability between the fleet operator and individual fleet vehicle drivers.

Also known are wireless (radio) handsets (e.g., cellular telephone handsets, personal digital assistants) that can receive and output text messages. For example, the 1.8 GHz Personal Communications System (PCS) includes the dedicated use, low bandwidth, bitstream Short Message Service (SMS; defined in TIA/EIA/IS-707). Using the SMS, messages originating from a server, or in the form of electronic mail (email) from a personal computer, are routed to the PCS handset for output on the handset display.

Wireless handsets have become increasingly smaller. This small size often makes handset operation difficult, especially in a motor vehicle. For example, handset dial pad buttons are small. In addition, handset visual displays (e.g., liquid crystal display) are small, and text messages that are output on the displays are difficult to read due to small character size and the limited amount of characters that are displayed. In-vehicle handset operation and message display is further limited during poor lighting conditions such as sunlight glare or during nighttime. Furthermore, handsets are often mounted in holders attached to the vehicle dashboard so that the handset is difficult to access and view from the driver's position. Therefore, it is desirable to provide enhanced in-vehicle wireless telephone handset operation. It is also desirable that such enhanced operation include enhanced text message output. Since a device external to the handset is used to provide such operating enhancements, it is desirable to warn the vehicle operator when the handset is not connected to the enhancing device.

SUMMARY

A wireless communication system handset (e.g., cellular) is coupled to communicate via a wired or wireless (radio; e.g., BLUETOOTH) link with a handset controller positioned in a motor vehicle. The handset controller is programmed to execute instructions that allow the controller to control operations of the handset. These operations include sending and receiving messages (e.g., short message service messages) via the handset, and dialing telephone numbers. The handset controller also warns the user if the handset is, or becomes, disconnected from the controller. The handset controller includes input keys that are larger (e.g., on the scale of conventional keys on a desk top computer keyboard) than the keys on the handset. In some embodiments the number of controller input keys is larger than the number of keys on the handset, thereby enabling features such as dialing a telephone number by pressing a single button (one step dialing). The controller also includes a display significantly larger (e.g., 2 inches high×6 inches wide, or more) than the handset display. The controller display is capable of displaying message text characters that are larger than the characters output on the handset display, and is also capable of displaying a larger amount of message text than can be output on the handset display. The larger keys and larger display facilitate handset operation by a user in a motor vehicle. In one case the input keys and the display are backlighted to enhance their visibility in the vehicle interior environment. In one case the handset controller includes a voice command input unit that allows the user to control the handset by speaking voice commands, and includes a voice synthesis output unit that allows messages received by the handset to be audibly output to the user in a synthesized voice. In one case the handset controller is part of a system that determines the geographic position of the vehicle (e.g., by using GPS) that relays the determined position to a remote server.

DETAILED DESCRIPTION

The same or similar elements are shown in the accompanying drawings as having identical reference numbers. Skilled artisans will understand that some well-known communication system components have been omitted from the drawings and accompanying text so as to more clearly describe embodiments. In this disclosure, unless stated otherwise, "user" refers to the person in a vehicle (typically the vehicle driver) who is operating the telephone handset in accordance with this disclosure.

Figure 1:
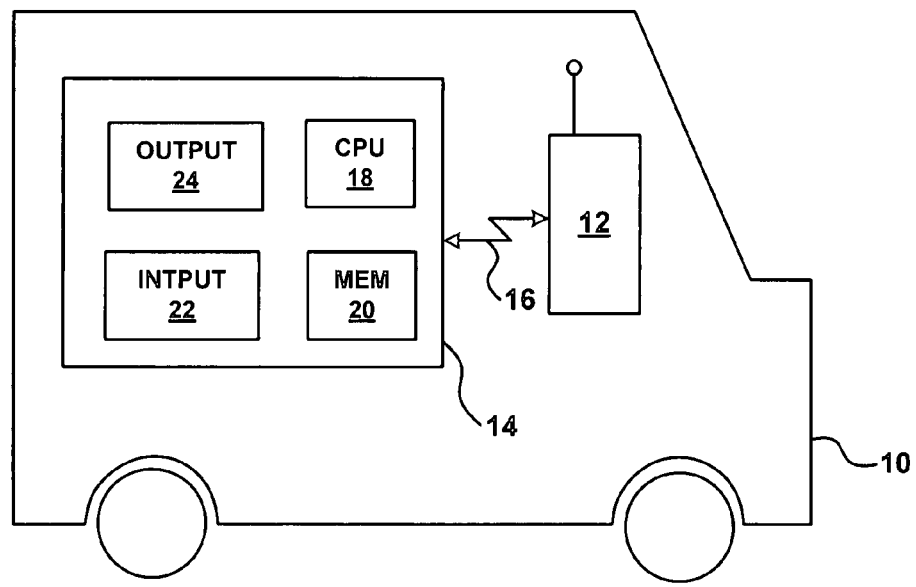
FIG. 1 is a diagrammatic view showing a handset controller coupled to a handset within the interior of a motor vehicle.

FIG. 1 is a diagrammatic view of one embodiment of an in-vehicle telephone handset operating system. Within motor vehicle 10 (e.g., a delivery vehicle) are positioned conventional cellular telephone handset 12 and handset controller 14. Handset 12 and controller 14 are coupled via conventional communications link 16, which is in one case a hardware link (e.g., cable) and in a second case a wireless link (e.g., BLUETOOTH™ wireless technology). This disclosure generally refers to embodiments in which handset 12 is a cellular telephone handset, but persons skilled in the art will understand that handset 12 may be, for example, a paging system receiver or a combination of a cellular telephone handset and personal digital assistant (PDA), such as the VISORPHONE™ manufactured by Handspring, Inc., Mountain View, Calif. In some cases in which a PDA is used, portions of the PDA are configured to act as parts of controller 14.

Controller 14 includes central processor unit (CPU) 18, memory 20, input unit 22, and output unit 24. CPU 18 is conventional and executes coded instructions to externally control handset 12 features such as dialing; sending, receiving, managing, and outputting messages to the user using, for example, the short message service (SMS); managing internally stored telephone number lists (personal telephone books); and any other feature enabled in handset 12, if desired.

Memory 20 is, for example, random access memory (e.g., SRAM) and read-only memory (e.g., flash memory). Information stored in memory 20 includes images of information stored in handset 12 (e.g., configuration data, text messages), as well as coded instructions (e.g., software) for operating controller 14.

CPU 18 is coupled to receive inputs from the user via input unit 22 so as to control handset 12 operation. In one case input unit 22 includes input keys, such as a conventional numeric keypad or conventional QWERTY keyboard. In some cases input unit 22 has other buttons or switches (e.g., function keys) for specific data entry functions, as well as cursor control keys. The keys on input unit 22 are significantly larger (e.g., on the scale of conventional keys on a desk top computer keyboard—at least 0.5-inch×0.5-inch each) than the keypad buttons on handset 12 (typically all arranged in a 1.5-inch×1.5-inch array), thereby allowing the user to more easily enter control commands (e.g., handset dialing, one-step speed dialing, received message management) and data (e.g., personal telephone book information) for handset 12. In one case the keypad is rigidly mounted in the vehicle to facilitate one-hand operation by the user. In one case the keypad is backlighted to improve visibility in low light conditions. In one case input unit 22 includes a microphone coupled to pass the user's voice to handset 12 during a telephone conversation. Other voice input capability is described below.

CPU 18 is coupled to output information from handset 12 to the user via output unit 24. Output unit 24 includes a conventional visual display (e.g., liquid crystal, thin film transistor) that displays, for example, messages received via handset 22. The output unit 24 display is larger (e.g., 2-inch×6-inch or more) than the visual display in handset 12 (typically 0.5-inch×1.5-inch, thereby allowing the user to view more message text at one time (either from single or multiple messages). In some cases, font sizes displayed on the unit 24 display are larger (e.g., 0.5-inch) than are displayed on the handset 12 display. Such larger font sizes allow the user to easily read displayed text from the driver's seat when unit 24 is in a fixed position in the vehicle (e.g., 2-3 feet from the driver's eyes). Thus in one case the display is mounted in the vehicle so as to be easily visible from the driver's seat. In one case the visual display is backlighted to optimize the display contrast in the motor vehicle environment, thereby allowing the user to more easily view the output presented on the display. In one case, output unit 24 includes a conventional amplifier and speaker that amplifies the received portion of a telephone conversation. Other voice output capability is described below.

During in-vehicle operation, the user operates handset 12 using controller 14. Inputs normally made on handset 12's keypad are made instead via input unit 22. Likewise, outputs normally made on handset 12's visual display are made via output unit 24. The larger size and enhanced visibility of the input keys and output displays facilitates user operation in the vehicle.

Embodiments of the in-vehicle telephone handset operating system as shown in FIG. 1 include the capability to receive the user's voice commands and to output synthesized voice information to the user. For example, in one case input unit 22 includes conventional speech recognition technology, such as that produced by Lernout & Hauspie Speech Products, N.V., Belgium, or such as that produced by Cellport Systems, Boulder Colo. In one case, output unit 24 includes conventional speech synthesis technology such as REALSPEAK™ by Lernout & Hauspie.

The use of voice commands to control handset 12 operation enhances safety since it allows a user to operate handset 12 while keeping their hands on the vehicle controls. Further, audible output of text messages also enhances safety because it allows a user to access text information without moving their eyes from the road to see the display screen.

Figure 2:
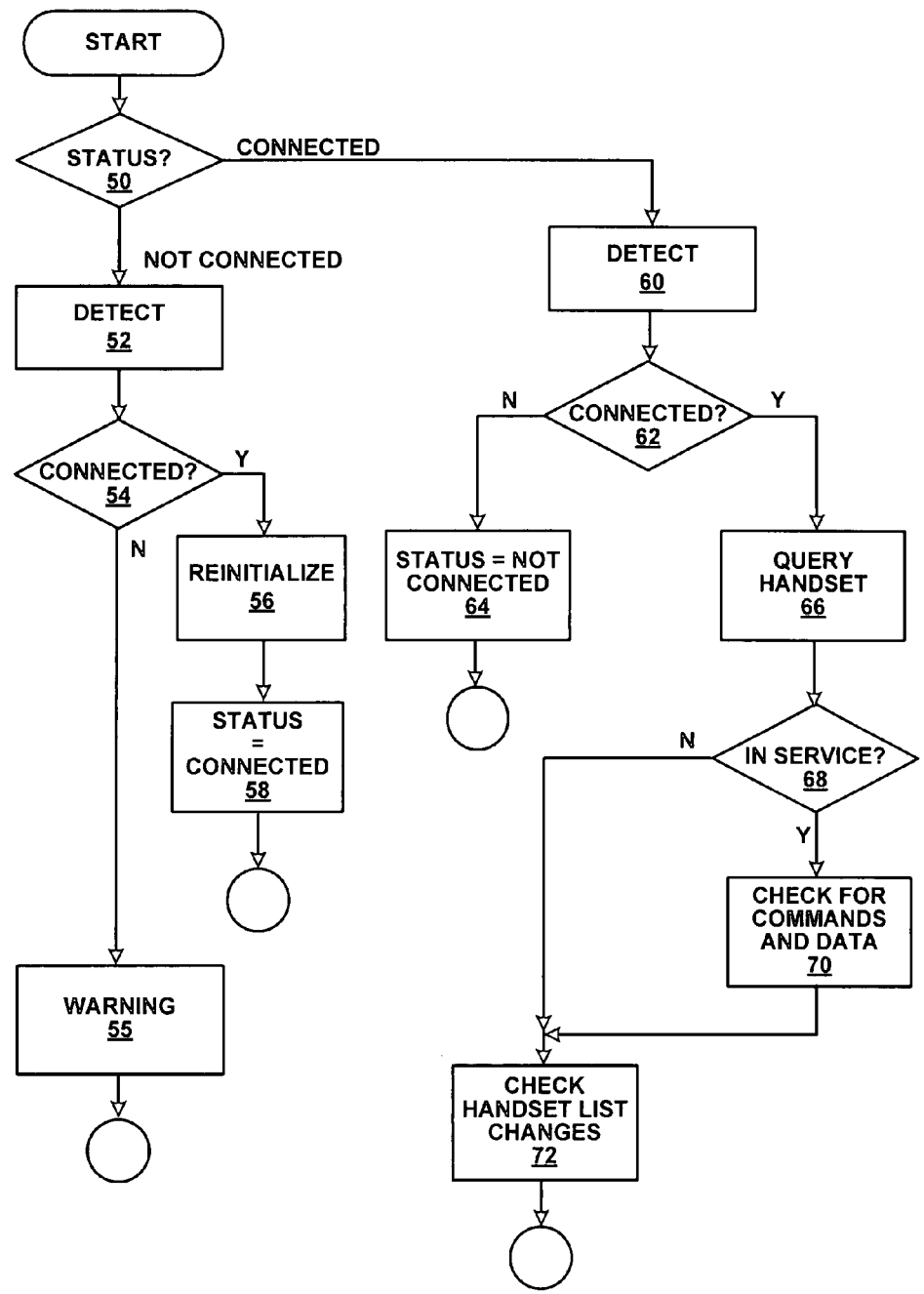
FIG. 2 is flow diagram showing a procedure executed by a handset controller.

FIG. 2 illustrates an embodiment of a process periodically executed (e.g., once per second) by CPU 18 to monitor handset 12 connection status. A phone status flag in memory 20, for example, indicates the handset 12 status as either "connected" or "not connected" and is initially set to "not connected."

In 50 the phone status flag is checked. If the status is "not connected" then CPU 18 detects in 52 if the handset is connected. In one case CPU 18 checks for connection using hardware (e.g., using RS232 Data Set Ready (DSR) line). In another case CPU 18 checks for connection using software (e.g., sending the AT command ATE1 to force echoing).

In 54 CPU 18 examines the result of 52. If the result in 52 indicates that handset 12 is not connected, the connection status flag remains "not connected" and in 55 CPU 18 outputs to the user a warning (either visible or audible) via output unit 24 that handset 12 is not connected. In some instances an audible warning in 55 is output if handset 12 is not connected and the vehicle engine is started. In some instances the audible warning in 55 is output if handset 12 is not connected and the vehicle begins moving.

If the result in 52 indicates that handset 12 is connected, in 56 CPU 18 reinitializes handset 12. Reinitialization includes issuing a telephone reset command (e.g., ATZ command); setting, for example, telephone configuration; and reading handset 12's Internet Protocol (IP) address, SMS lists, and internally stored telephone number lists. Once reinitialized, handset 12 is configured to communicate with controller 14 using, for example, point-to-point protocol (PPP) or serial line IP (SLIP). Once reinitialization is complete, in 58 CPU 18 sets the connection status flag to "connected."

If the connection status in 50 is "connected," then in 60 CPU 18 detects if handset 12 is connected using procedures similar to those in 52.

In 62 CPU 18 examines the result of 60. If the result in 60 indicates that handset 12 is not connected, in 64 CPU 18 resets the connection status flag to "not connected" and CPU 18 outputs to the user a warning (either visible or audible) via output unit 24 that handset 12 is not connected. If the result in 62 indicates that handset 12 remains connected, then in 66 CPU 18 queries handset 12 to determine if the handset is in or out of service. In one case a telephone handset is queried using conventional AT commands. In another case in which the connection to the telephone handset is using PPP or SLIP, the query is done using proprietary queries.

If CPU 18 determines in 66 that handset 12 is in service, in 70 CPU checks for commands and data to be received or transmitted between handset 12 and handset controller 14. Such commands and data include IP data to transmit or receive, newly received SMS messages, and the user's handset control inputs from input unit 22. In one case the commands and data sent to or received from handset 12 are asynchronously sent or received via low level serial interface buffers in controller 14.

Once 70 is complete, or if in 68 handset 12 is determined to be out of service, in 72 CPU 18 checks for personal phonebook, SMS list changes, and other stored data updates in handset 12. Since many telephone handsets allow the user to edit SMS messages and personal phone books via the handset's user interface, it is necessary to update the SMS list and personal telephone book information stored in memory 20 with the latest information from handset 12.

Figure 3:
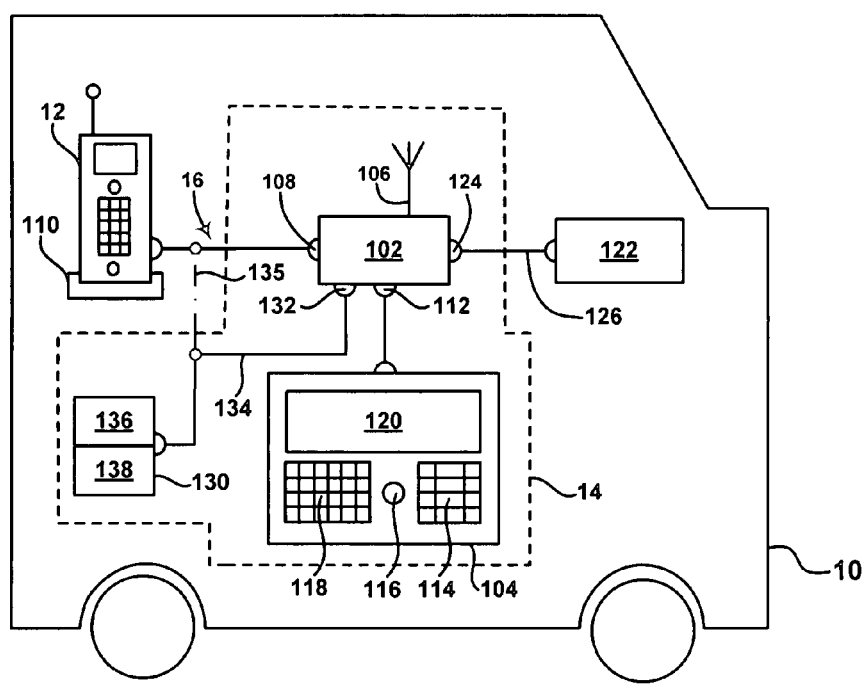
FIG. 3 is a diagrammatic view showing an embodiment of a handset controller.

FIG. 3 is a diagrammatic view of an embodiment of an in-vehicle telephone handset controller. As shown in FIG. 3, control unit 14 includes processing unit 102 (e.g., At Road, Inc., part no. iLM2000 "Location Manager") and data terminal 104 (e.g., At Road, Inc., part no. iDT2000 "Data Terminal"). In one embodiment processing unit 102 is part of a motor vehicle fleet management system and includes a conventional global positioning system (GPS) chipset to determine the unit 102 position from GPS signals received via conventional antenna 106. The determined position is sent to a remote fleet management system computer via a wireless modem in processing unit 102 or in one case, via handset 12.

Handset 12 is coupled to processing unit 102 at serial communications port 108. In some cases handset 12 is mounted in holder 110 that is attached to, for example, vehicle 10's dashboard. As discussed above, communications link 16 is either hardware (e.g., serial communications cable) or wireless (e.g., BLUETOOTH™). In one case in which link 16 is hardware, the battery in handset 12 is charged via link 16 from processing unit 102.

Data terminal 104 is coupled to processing unit 102 at port 112. As shown in FIG. 3, data terminal 104 includes numeric keypad 114, cursor control 116, data entry keys 118 (e.g., specific function keys, QWERTY alphanumeric keys), and visual display 120. In one case terminal 104 is secured (using, e.g., a rigid bracket) to vehicle 10 in a position to allow the user to view display 120 and to operate keys 114,118 from the driver's position. In one case data terminal 104 includes a conventional audio speaker (not shown) for audio output of data to the user. In one case display 120 and data entry keys 118 are combined as a conventional LCD touch screen. Terminal 104 may include voice recognition (command and control) capability as described below.

Optional auxiliary data source 122 is coupled to port 124 on processing unit 102 via conventional communications cable 126. Data source 122 is illustrative of one of many in-vehicle data sources such as a vehicle data bus, a bar code scanner, a QWERTY keyboard input, temperature sensors, vehicle door status sensors, and driver seat pressure sensors. In other embodiments data source 122 is coupled to data terminal 104.

In an illustrative example, the user enters one or more "dialing/control" modes by pressing one or more keys on keyboard 118 in data terminal 104. Confirmation that the appropriate "dialing/control" mode has been selected is displayed on display 120. In one "dialing/control" mode the user then enters a telephone number using keypad 114. The dialed telephone number identifies a text message destination. Next, the user enters one or more text messages using keyboard 118 or data source 122 configured as a QWERTY keyboard. When the text message is entered, the vehicle operator then enters a "send" command on data terminal 104 that directs handset 12 to transmit the entered message to, for example, the destination identified by the previously entered telephone number. After sending the text message, the user enters a "server display" mode by entering another command on keyboard 118 to view, for example, fleet management information. These "dialing/control," "send," and "server display" commands are illustrative of many possible commands that are entered on data terminal 104 for controlling handset 12 operation.

In some cases user input and output to processing unit 102 is via voice recognition and voice synthesis technology, respectively. In one case voice unit 130 is coupled to port 132 on processing unit 102 via cable 134. In another case voice unit 130 is coupled to handset 12 as shown by alternate link (wired or wireless) 135. When voice unit 130 and terminal 104 are coupled they may operate using the same interface, thereby providing alternate input/output implementations. Unit 130 and terminal 104 may be combined in a single unit in some embodiments, so that voice commands are used to replace one or more key or button inputs on terminal 104. In some cases As shown in FIG. 3, voice unit 130 includes both voice command input unit 136 and voice synthesizer unit 138.

During operation the user speaks one or more commands which the speech recognition technology in voice command input unit 136 converts to commands to be executed by controller 14 to control handset 12 operation. For instance, to dial a telephone number the user speaks a "dial number" command, then speaks the number to be dialed, and finally speaks a "dial" command. Controller 14 receives these commands and the number to be dialed, and controls handset 12 to dial the user's desired number. In another instance, the user controls the display of messages on display 120 by speaking a "message display" command. In response, data terminal 104 displays messages received and stored by handset 12 on display 120. Optionally, the user selects one of the displayed messages to be read (e.g., message number 1) and speaks a command to read the selected message (e.g., "read one"). In response, the voice synthesizer in synthesizer unit 138 outputs a spoken version of the selected message text. In one case synthesizer unit 138 outputs synthesized speech for each received message that includes sender name and message subject so as to allow the user to select the message to be output. Received messages are managed using, for example, "store" and "delete" verbal commands. The verbal commands described herein are illustrative and skilled artisans will realize that many acceptable command and control functions exist to operate handset 12.

Figure 4:
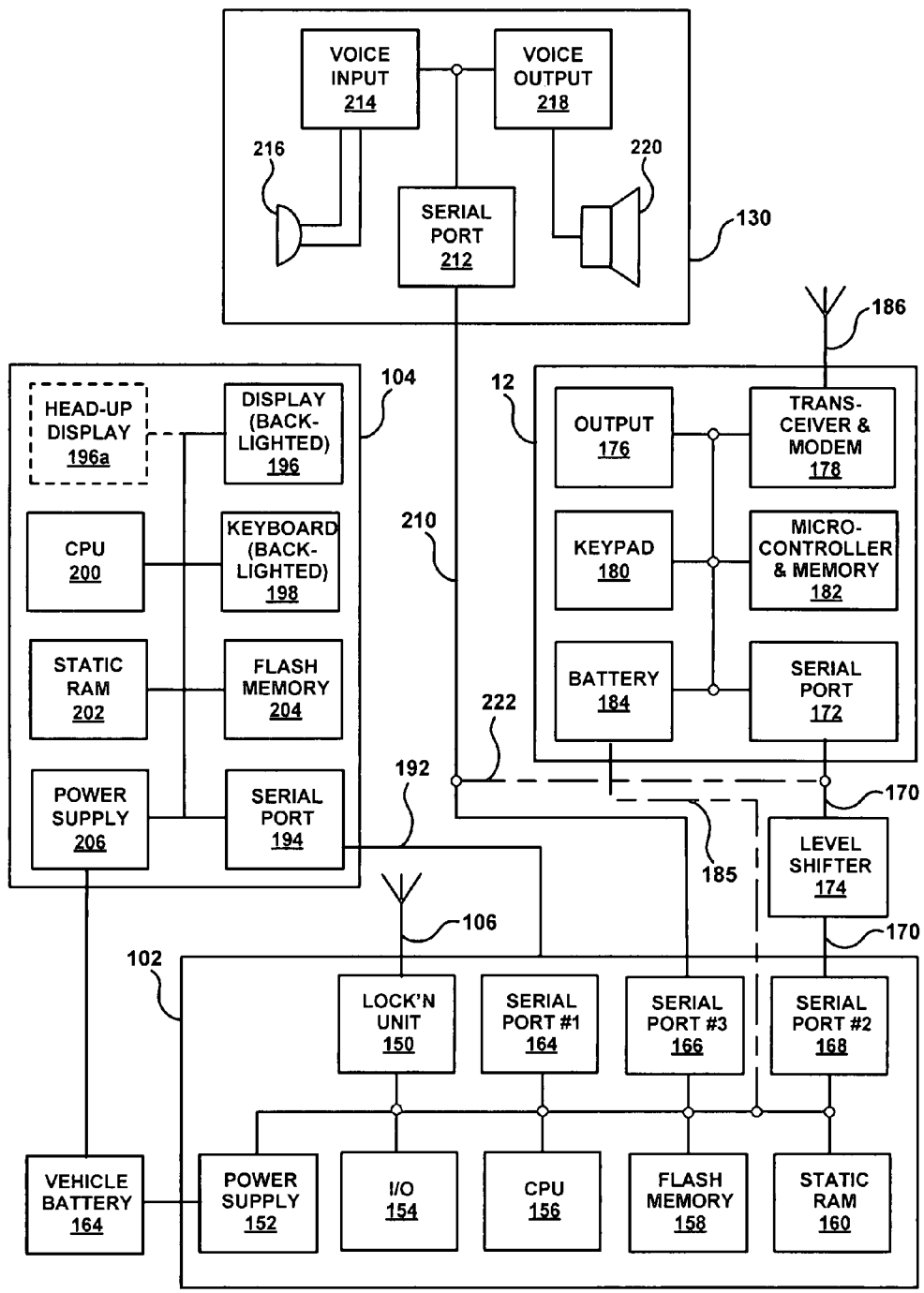
FIG. 4 is a diagrammatic view showing elements of the embodiment in FIG. 3 in more detail.

FIG. 4 is a functional diagram showing components of processing unit 102, data terminal 104, handset 12, and voice unit 130. As depicted in FIG. 4, terminal 104, handset 12, and voice unit 130 are coupled to processing unit 102 via hardware (e.g., cables) but wireless connections are used in other cases.

Processing unit 102 includes location unit 150, power supply 152, input/output (I/O) unit 154, central processor unit 156, flash memory 158, and static random access memory 160. In one instance location unit 150 includes a conventional GPS chip set. Unit 150 receives GPS signals via antenna 106 and determines processing unit 102's geographic location. In an alternative embodiment, location unit 150 determines geographic location from other ground-based signals, such as from cellular telephone signals that are received via antenna 106 or via handset 12.

Conventional power supply 152 provides electric power to components in processing unit 102. In some embodiments power supply 152 is electrically coupled to motor vehicle battery 164 which supplies electric power to power supply 152.

Conventional input/output unit 154 includes controls (e.g., buttons, switches) to allow the user to control processing unit 102 operation. Input/output unit 154 also includes output indicators (e.g., lights) that display information regarding unit 102 operation to the user or to system maintenance personnel.

CPU 156 includes a conventional microprocessor/microcontroller (the terms are synonymous as used herein) with associated circuits, and executes coded instructions to control both processing unit 102 and handset 12 operation. Conventional memories 158,160 are illustrative of memory capacity in processing unit 102. In one case, flash memory 158 and conventional SRAM 160 store instructions and data used by CPU 156 during processing unit 102 operation. For example, stored instructions direct CPU 156 to execute the procedure described with reference to FIG. 2.

As depicted in FIG. 4, processing unit 102 includes three communications ports 164,166,168. In one case ports 164, 166,168 are conventional serial ports. In other cases other communications protocol ports are used. As depicted in FIG. 4, port 168 is also used as a battery charger terminal to charge, for example, the battery in handset 12, thereby ensuring that the battery is charged when the user removes handset 12 from vehicle 10.

FIG. 4 shows handset 12 and processing unit 102 electrically coupled via conventional cable 170 between ports 168 and 172. Cable 170 includes conventional level shifter 174 and is connected to ports 168,172 using, for example, RJ45 connectors. In some embodiments level shifter 174 is omitted. PCS handset manufacturers use various unique serial interface protocols to facilitate communication using port 172. Thus the handset interface software in processing unit 102 is capable of proper communication with one or more of such protocols. In another embodiment handset 12 and processing unit 102 are coupled using a wireless link such as the well-known BLUETOOTH™ short-range omnidirectional wireless data link protocol.

Handset 12 includes conventional audio/visual output unit 176, conventional transceiver and modem unit 178, conventional keypad 180, conventional microcontroller and memory unit 182, and conventional battery 184, all of which are illustrative of components in a conventional wireless telephone handset, such as a NEXTEL model no. I700PLUS™ data capable unit that uses the Motorola, Inc. IDEN® technology system, and also other devices including PDAs with telephone capability. In embodiments in which a PDA performs the handset 12 functions, the same PDA may perform some or all of the data terminal 104 functions as described below. In other embodiments, handset 12 may be a cellular telephone handset and the PDA performs some or all of the data terminal 104 functions.

Audio-visual output unit 176 includes a conventional audio output (not shown) that outputs telephone sound to the user when operating handset 12 as a stand-alone unit. In some cases output unit 176 also includes a conventional visual display (e.g., LCD display) (not shown) that outputs visible text to the user. Transceiver and modem unit 178 sends and receives radio signals via conventional antenna 186. These signals include conventionally coded voice and message information such as a telephone conversation between two parties, a paging signal, or a Personal Communications System (PCS) Short Message Service (SMS) text message. These signals may also include information representing images (e.g., World Wide Web pages) and video (e.g., MPEG file). Keypad 180 is a conventional cellular telephone keypad and includes numeric keys used to dial telephone numbers. Microcontroller and memory unit 182 includes a microcontroller/microprocessor that controls handset 12 operation using coded instructions (e.g., software, firmware) that are stored in the memory portion. In some instances these instructions are modified to conform with embodiments as described herein. The memory portion also includes locations at which received information or information to be transmitted is stored. Battery 184 provides electric power to operate handset 12 and in some cases is charged by processing unit 102 through port 172 as illustrated by optional cable 185 that couples power supply 152 and battery 184. For instances in which a separate battery 184 charging input terminal is provided on handset 12, cable 185 further illustrates that power supply 152 charges battery 184 via such a separate terminal.

Data terminal 104 is coupled to processing unit 102 (and thereby is coupled to handset 12) via conventional cable 192 between ports 164 and 194. In one case data terminal 104 is a proprietary terminal (e.g., iDT2000) and in other cases terminal 104 is a part of another data processing system (e.g., portable laptop computer, personal digital assistant, etc.). Thus many application programs (e.g., electronic mail programs, World Wide Web browser programs) stored on the data processing system may be operated by using the wireless interface provided by handset 12.

As shown in FIG. 4, data terminal 104 includes components that are illustrative of many systems, including conventional visual output display 196, conventional keyboard 198, conventional CPU 200, conventional static RAM 202, conventional flash memory 204, and conventional power supply 206.

Display 196 is, for example, a conventional liquid crystal or thin film transistor display. In some cases display 196 is conventionally backlighted or otherwise provided a high visual contrast. This high contrast display allows the user to more clearly see the output on display 196 in poor viewing conditions such as low ambient light or sun glare. In some embodiments the display contrast is optimized with respect to the specific viewing conditions in the vehicle.

In some cases visual output is via a heads-up display unit 196a, mounted so that a visual output display focused at infinity is seen by the driver while looking through the windshield. Heads-up display 196a may replace or may be in addition to display 196.

Keyboard 198 is illustrative of user data input capability, and in one case includes buttons that the user presses to input various commands (e.g., display message, send message) to data terminal 104. In another case keyboard 198 includes a QWERTY keyboard used to input text information into terminal 104. In one case keyboard 198 includes a conventional cursor control input for controlling a cursor displayed on display 196. The buttons on keyboard 198 are larger than those on keypad 180 (e.g., the size of conventional typewriter keys), thereby allowing the user to more easily control handset 12 functions while in the vehicle. In one case the buttons and controls on keyboard 198 are conventionally backlighted so as to allow the user to more easily see the buttons and controls in poor viewing conditions.

CPU 200 includes a conventional microprocessor/microcontroller with associated circuits, and controls data terminal 104 operation. Static RAM 202 and flash memory 204 store instructions (e.g., software, firmware) used by CPU 200 to operate data terminal 104. Memories 202,204 are also used to store data for display on display 196 and/or to store data entered using keyboard 198.

Conventional power supply 206 supplies electric power to components of data terminal 104 and is, in one case, coupled to vehicle battery 206.

Voice unit 130 is coupled to processing unit 102 via conventional cable 210 between ports 166 and 212. Voice unit 130 includes the combination of voice input unit 214 and microphone 216, and also the combination of voice output unit 218 and speaker 220. Voice unit 130 is shown separate, but in some cases is combined with data terminal 104. Voice input unit 214 includes a microprocessor executing speech recognition software (e.g., manufactured by Lernout & Hauspie) and allows the user to operate handset 12 features by giving voice commands instead of manual inputs using, for example, keyboard 198 or keypad 180. Voice output unit 218 converts data (e.g., text message, message management information) to a synthesized voice output via speaker 220. Thus a text message may be displayed on display 196 and/or audibly output by output unit 218. In one case speaker 220 is the speaker associated with the motor vehicle's radio. Voice output unit 218 includes a microprocessor executing voice synthesis software, (e.g., REALSPEAK™).

In some embodiments voice unit 130 is coupled directly to handset 12 as shown by alternate communications link (wired or wireless (e.g., BLUETOOTH)) 222. In this manner provides control inputs to, and receives outputs from, handset 12.

Figure 5:
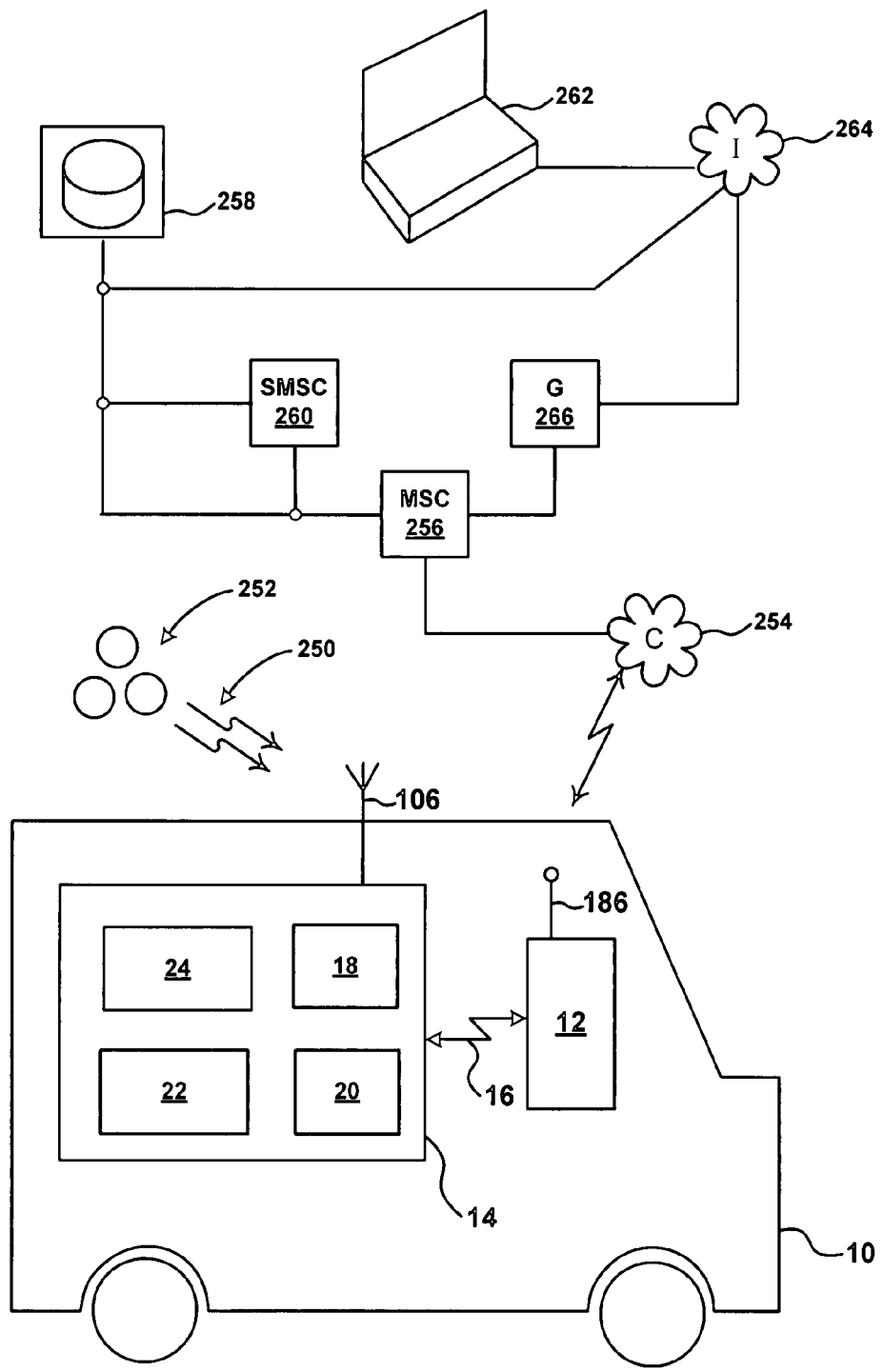
FIG. 5 is a diagrammatic view illustrating operation of a handset controller.

FIG. 5 is a diagrammatic view illustrating operation of one embodiment. Handset controller 14 receives signals 250 from GPS satellites 252 via antenna 106 and then determines vehicle 10's geographic position. Controller 14 transmits the location information (for example, using a dedicated wireless modem coupled to antenna 106 or using handset 12) via cellular telephone system 254 and mobile switching center 256 to conventional computer platform 258, which is programmed to act as a motor vehicle fleet management server (e.g., FLEETASAP™ by At Road, Inc.). The transmission of location information is illustrative of the data that may be transmitted from controller 14 to computer (server) 258, such data including all information supplied by one or more auxiliary data sources 122 (FIG. 3) in vehicle 10. Furthermore, cellular system 254 and mobile switching center 256 are illustrative of other wireless communication systems (e.g., metro- or wide-area wireless networks) used to route information from vehicle 10 to and from computer (server) 258.

Computer (server) 258 may send data to handset controller 14 for output on output unit 24. In one case data is sent from computer (server) 258 directly to mobile switching center 256. In another case, message text data is sent from computer (server) 258 to mobile switching center 256 via short message service center 260.

As shown in FIG. 5, information (e.g., email) also passes between conventional computer 262 and controller 14 via the Internet 264 (network of interconnected networks, having its origins in research by the United States Advanced Research Projects Agency), conventional Internet gateway 266, mobile switching center 256, cellular system 254, and handset 12. Computer (server) 258 and computer 262 illustrate that handset 12 may receive messages in various formats sent via different protocols. Thus handset 12 and/or controller 14 differentiates among the various message formats and protocols that are received and outputs each received message in the sender's intended format via output unit 24. For example, handset 12 identifies both electronic mail format and SMS format messages, and received messages are correctly output to the user as intended by the email and SMS message senders.

Using the enhanced control features described above, the user in vehicle 10 controls handset 12 operation and both sends and receives information from illustrative computer (server) 258 and computer 262. The large visual display in output unit 24 allows the user to more clearly view received messages and to more easily sort and otherwise manage several received messages. The large input keys in input unit 22 allow the user to more easily input handset 12 control commands and data to be sent to computer (server) 258 or computer 262. User operation and motor vehicle safety is further enhanced in embodiments using voice input and output as described herein. Further, by using verbal commands and receiving audio output, the vehicle driver saves time by being able to drive the vehicle while simultaneously accessing, managing, and outputting text messages without having to take his or her hands from the steering wheel. Embodiments are also used to alert the user about short-notice cargo pickups while the user is enroute between planned stops, thus preventing the need for the user to backtrack to make the pickup after checking for messages during a subsequent planned stop. The enhanced control of the telephone handset has been described in terms of specific embodiments, but other embodiments exist, and software coding for all embodiments is routine in light of this disclosure. Accordingly, persons skilled in the art will understand that many variations of the invention as described herein are possible, and that the scope of the invention is defined by the following claims.

We claim:

1. An in-vehicle wireless communication system handset controller comprising:
    a central processing unit;
    an interface to an in-vehicle location information processing unit, the location information processing unit determining a geographical position of the in-vehicle wireless communication system and being connected to a wireless communication system handset, wherein, through the wireless communication system handset, the location information unit accesses a wide area computer network to communicate the geographical position and wherein the location information processing unit and the central processing unit are configured to control the wireless communication handset;
    an input unit comprising data input keys larger than keys on a keypad of the handset; and
    an output unit comprising a display larger than a display of the handset, wherein displayed message text characters on the output unit display are larger than displayed message text characters on the handset display, and wherein, while the handset is operationally coupled to the handset controller and while the central processing unit has control of the handset, the central processing unit executes instructions which (a) allow the keys of the input unit to be used to provide input data to the handset, and (b) output data for display on the output unit display.

2. The handset controller of claim 1, wherein the location information processing unit comprises a global positioning system chipset.

3. The handset controller of claim 1, wherein short message service messages are input via the input unit and output through the output unit.

4. The handset controller of claim 1, wherein an audible warning is issued when the handset is not operationally coupled to the handset controller.

5. The handset controller of claim 1, wherein a warning is output if the handset is not operationally coupled to the handset controller and an engine of the vehicle is started.

6. The handset controller of claim 1, wherein a warning is output if the handset is not operationally coupled to the handset controller and the vehicle begins to move.

7. The handset controller of claim 1, wherein the data input keys are backlighted.

8. The handset controller of claim 1, wherein the number of data input keys is larger than the number of keys on the handset keypad.

9. The handset controller of claim 1, wherein the display is backlighted.

10. The handset controller of claim 1, wherein the display comprises a heads-up display positioned such that a driver of the vehicle sees a displayed image while looking through a windshield of the vehicle.

11. The handset controller of claim 1, wherein the controller is rigidly positioned in the interior of a motor vehicle to allow a driver of the vehicle, while seated in a driver's seat, to view messages on the display and to operate the data input keys.

12. The handset controller of claim 1 further comprising a voice command input unit coupled to allow the user to cause the handset to dial a telephone number and to manage messages received by the handset.

13. The handset controller of claim 1 further comprising a voice synthesizer unit coupled to audibly output a message received by the handset.

14. The handset controller of claim 1, wherein the controller is coupled to the handset via a wireless communication link.

15. The handset controller of claim 1, wherein the handset is a cellular telephone handset.

16. The handset controller of claim 1 further comprising a power supply coupled to charge a battery in the handset.

17. A method for controlling a wireless communication system handset, comprising the acts of:
providing an in-vehicle location processing unit that determines a geographical position and couples to a wireless communication handset, wherein the location processing unit, through the wireless communication handset, accesses a wide area network to communicate the geographical position; and
providing, in the location processing unit, an interface through which an in-vehicle controller may operationally couple to the wireless communication handset; wherein, while the handset is operationally coupled to the in-vehicle controller, the in-vehicle controller carries out a a method comprising:
(a) enabling keys on an input unit of the in-vehicle controller to receive input data for the handset, the keys on the controller being larger than keys on the handset; and
(b) displaying messages received by the handset on a display in an output unit of the handset controller, such that displayed message text characters are larger than message text characters displayed by the handset; and
(c) outputting a warning if the handset is not operationally coupled to the controller.

18. The method of claim 17, the method carried out by the in-vehicle controller further comprising outputting the warning if an engine of the vehicle is started.

19. The method of claim 17, the method carried out by the in-vehicle controller further comprising outputting the warning if the vehicle begins to move.

20. The method of claim 17, the method carried out by the in-vehicle controller further comprising backlighting keys on the controller.

21. The method of claim 17, the method carried out by the in-vehicle controller further comprising backlighting a display outputting the larger message text characters.

22. The method of claim 17, the method carried out by the in-vehicle controller further comprising using a heads-up display to display the received messages.

23. The method of claim 17, the method carried out by the in-vehicle controller further comprising the acts of enabling a voice interface on the in-vehicle controller to control the operations of the handset.

24. The method of claim 17 further comprising using a power supply in the controller to charge a battery in the handset.

25. The method of claim 17 further comprising the acts of:
using the location processing unit to determine a geographic position of the vehicle; and
sending the determined position over the wire area network to a computer.

26. The method of claim 17, the method carried out by the in-vehicle controller further comprising the acts of:
receiving a plurality of messages through the handset, wherein each unique received message is formatted by a corresponding unique sender in one of a plurality of communication protocols;
identifying the communication protocol and format of each received message; and
outputting each unique received message as formatted by each corresponding unique sender.

27. The method of claim 26, wherein one of the received messages is a cargo pickup or delivery instruction to a driver of the vehicle.

28. An in-vehicle wireless communication system handset controller comprising:
a central processing unit;
an interface to an in-vehicle location information processing unit, the location information processing unit determining a geographical position of the in-vehicle wireless communication system and being connected to a wireless communication system handset, wherein the location information processing unit, through the wireless communication system handset, accesses a wide area computer network to communicate the geographical position and wherein the location information processing unit and the central processing unit are configured to control the wireless communication handset;
a memory comprising instructions executable by the central processing unit for interacting with the location information processing unit to operationally couple and to gain control of the wireless communication handset;
an input unit comprising data input keys larger than keys on a keypad of the handset; and
an output unit comprising a display larger than a display of the handset, wherein the display is configured to output a number of displayed message text characters larger than a number of displayed message text characters output on the handset display, and wherein, while the handset is operationally coupled to the handset controller and while the central processing unit has control of the handset, the central processing unit executes instructions which (a) allow the keys of the input unit to be used to provide input data to the handset, and (b) output messages for the handset on the output unit display.

29. The handset controller of claim 28, wherein the location information processing unit comprises a global positioning system chipset coupled to the central processing unit.

30. The handset controller of claim 28, wherein at least a portion of the messages are short message service messages.

31. The handset controller of claim 28, wherein an audible warning is issued if the handset is not operationally coupled to the handset controller.

32. The handset controller of claim 28, wherein a warning is output if the handset is not operationally coupled to the handset controller and an engine of the vehicle is started.

33. The handset controller of claim 28, wherein a warning is output if the handset is not operationally coupled to the handset controller and the vehicle begins to move.

34. The handset controller of claim 28, wherein the data input keys are backlighted.

35. The handset controller of claim 28, wherein the number of data input keys is larger than the number of keys on the handset keypad.

36. The handset controller of claim 28, wherein the display is backlighted.

37. The handset controller of claim 28, wherein the display comprises a heads-up display positioned such that a driver of the vehicle sees a displayed image while looking through a windshield of the vehicle.

38. The handset controller of claim 28, wherein the controller is rigidly positioned in the interior of a motor vehicle to allow a driver of the vehicle, while seated in a driver's seat, to view messages on the display and to operate the data input keys.

39. The handset controller of claim 28 further comprising a voice command input unit coupled to allow the user to cause the handset to dial a telephone number and to manage messages received by the handset.

40. The handset controller of claim 28 further comprising a voice synthesizer unit coupled to audibly output a message received by the handset.

41. The handset controller of claim 28, wherein the controller is coupled to the handset via a wireless communication link.

42. The handset controller of claim 28, wherein the handset is a cellular telephone handset.

43. The handset controller of claim 28 further comprising a power supply coupled to charge a battery in the handset.

44. A method for controlling a wireless communication system handset, comprising the acts of:
providing an in-vehicle location processing unit that determines a geographical position and couples to a wireless communication handset, wherein the location processing unit, through the wireless communication system handset, accesses a wide area network to communicate the geographical position;
providing, in the location processing unit, an interface through which an in-vehicle controller may operationally couple to the handset; and
executing computer instructions stored in a memory device of the in-vehicle controller to operationally couple the in-vehicle controller to the handset and to gain control of the handset; wherein, while the handset is operationally coupled to an in-vehicle controller, the in-vehicle controller carries out a method comprising:
(a) enabling keys on an input unit of an in-vehicle controller to receive input data for the handset, the keys on the controller being larger than keys on the handset;
(b) displaying messages received by the handset on a display in an output unit of the handset controller, such that a number of displayed message text characters is larger than a number of displayed message text characters output on the handset display; and
(c) outputting a warning if the handset is not operationally coupled to the controller.

45. The method of claim 44, the method carried out by the in-vehicle controller further comprising outputting the warning if an engine of the vehicle is started.

46. The method of claim 44, the method carried out by the in-vehicle controller further comprising outputting the warning if the vehicle begins to move.

47. The method of claim 44, the method carried out by the in-vehicle controller further comprising backlighting keys on the controller.

48. The method of claim 44, the method carried out by the in-vehicle controller further comprising backlighting a display outputting the larger message text characters.

49. The method of claim 44, the method carried out by the in-vehicle controller further comprising using a heads-up display to display the received messages.

50. The method of claim 44, the method carried out by the in-vehicle controller further comprising the acts of:
enabling a voice interface on the handset controller to control the operations of the handset.

51. The method of claim 44 further comprising using a power supply in the controller to charge a battery in the handset.

52. The method of claim 44 further comprising the acts of:
using the location information processing unit to determine a geographic position of the vehicle; and
sending the determined position over the wide area network to a computer.

53. The method of claim 44, the method carried out by the in-vehicle controller further comprising the acts of:
receiving a plurality of messages through the handset, wherein each unique received message is formatted by a corresponding unique sender in one of a plurality of communication protocols;
identifying the communication protocol and format of each received message; and
outputting each unique received message as formatted by each corresponding unique sender.

54. The method of claim 44, wherein one of the received messages is a cargo pickup or delivery instruction to a driver of the vehicle.

* * * * *